A. B. TOGNINI.
STARTER FOR AUTOMOBILES.
APPLICATION FILED APR. 19, 1915.
1,169,208.
Patented Jan. 25, 1916.
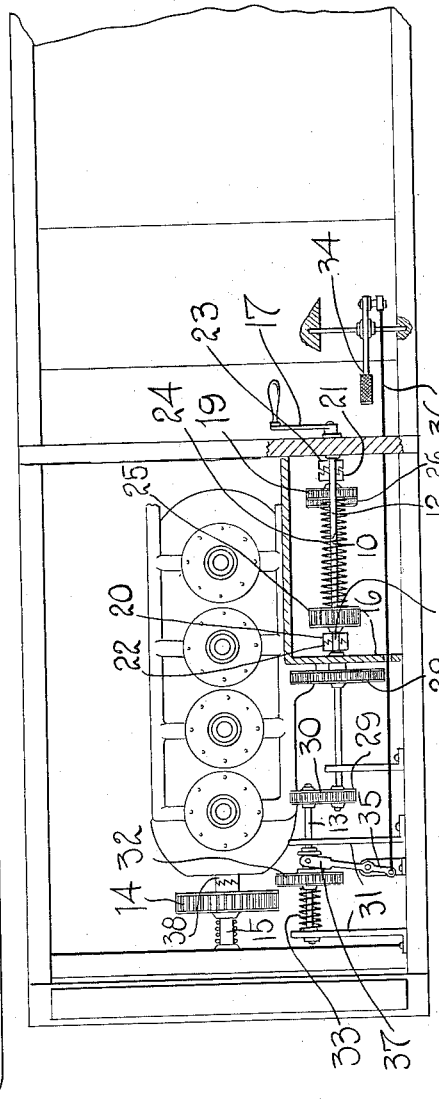
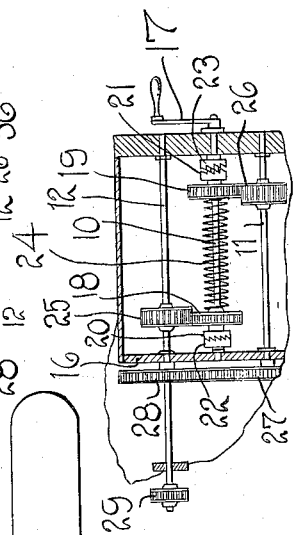
Inventor
ACHILLES B. TOGNINI
By Watson E. Coleman
Attorney

UNITED STATES PATENT OFFICE.

ACHILLES B. TOGNINI, OF CAYUCOS, CALIFORNIA.

STARTER FOR AUTOMOBILES.

1,169,208.   Specification of Letters Patent.   Patented Jan. 25, 1916.

Application filed April 19, 1915. Serial No. 22,434.

*To all whom it may concern:*

Be it known that I, ACHILLES B. TOGNINI, a citizen of the United States, residing at Cayucos, in the county of San Luis Obispo and State of California, have invented certain new and useful Improvements in Starters for Automobiles, of which the following is a specification, reference being had to the accompanying drawings.

My present invention relates to new and useful improvements in starting devices for automobiles and has particular reference to starters which are of the mechanical, manually operable type.

One of the principal objects of the invention is to provide a relatively simple and light, but strong device of this character which may be readily applied to or removed from any automobile of standard lines, without requiring any extended changes or alterations in the construction thereof.

Another object is to provide a manually operable starter which may be controlled from the driver's seat and is arranged within the hood of the vehicle, being provided with a handle which is located adjacent the foot-board.

A further important object is to provide a starter in which the drive shaft is connected to the fly wheel of the engine in such manner that the crank handle may be turned either clockwise or counter-clockwise, without changing the direction of rotation of the engine crank shaft.

The above, and other incidental objects of a similar nature, which will be hereinafter more specifically treated are accomplished by such means as are illustrated in the accompanying drawings, described in the following specification, and then more particularly pointed out in the claims which are appended hereto and form part of this application.

With reference to the drawings, wherein there has been illustrated the preferred embodiment of this invention, as it is reduced to practice, and throughout the several views of which similar reference numerals designate corresponding parts, Figure 1 is a top plan view of an automobile chassis and engine showing the starter in operative position, the bearing frame of the shafts and the starter, and a portion of the dash-board of the automobile being shown in section; and Fig. 2 is a vertical section taken through the bearing frame of the starter, disclosing the cranking shaft and driven shafts thereof.

As previously explained, the starter is adapted to be disposed for the most part within the hood of the automobile and is provided with a cranking handle which may be operated from the driver's seat of the vehicle. The starter includes as its principal element, a cranking shaft 10, a pair of driven shafts 11 and 12 and a jack shaft 13, by means of which the rotation of the shaft 12 is imparted to the fly wheel 14 of the automobile crank shaft indicated at 15.

The shafts 10, 11 and 12 are journaled in a substantially rectangular bearing frame 16 which is secured in any desired manner to the chassis and adjacent portions of the vehicle. The shaft 10 is provided with a handle 17 which passes through the dash of the vehicle and is disposed to be conveniently operated from the driver's seat of the vehicle. On the shaft 10 is mounted a pair of pinions 18 and 19 which are slidable upon the shaft and are free with respect thereto so that the shaft may, at times rotate independently of the pinions. On the forward face of the pinion 18 is formed a toothed clutch disk 20 and on the rear face of the pinion 19 is formed a similar clutch disk 21. These two members 20 and 21 are adapted to respectively engage with their complementary clutch disks 22 and 23 which are keyed on the shaft 10 in such manner that they are held against both rotative and sliding movement with respect to the shaft. A helical spring 24 is wound about the intermediate portion of the shaft 10 and is disposed with its terminals bearing against the pinions 18 and 19. This spring being of the expansible type, normally tends to hold the clutch members 20 and 21 in engagement with the clutch members 22 and 23. It is now to be observed that the teeth of the clutch members 20 and 21 are oppositely inclined as are the clutch teeth of the members 22 and 23. Because of this arrangement of the clutches, the pinion 19 will be positively rotated when the crank is rotated in a counter-clockwise direction. The counter-clockwise direction of the shaft 10 will, however, cause the clutch member 22 to slip with respect to the clutch member 23 and thus the pinion 18 will be allowed to slip. Upon the clockwise rotation of the shaft 10, the clutch members 21 and 23 will slip with respect to each other, however, and the clutch member 20 will positively engage the clutch 23, consequently causing a positive drive of the pinion 18.

The driven shafts 11 and 12 are each equipped with relatively small pinions 25 and 26, which are keyed on these shafts and are adapted to engage with the pinions 18 and 19. On the forward terminal of the shaft 11, is keyed a relatively large pinion 27 which is adapted to mesh with a similar pinion 28 keyed on the forward portion of the shaft 12. This latter member is also provided at its extreme forward terminal with a relatively small pinion 29 which is arranged to mesh with a pinion 30 carried on the rear end of the jack shaft 13. This jack shaft 13 is disposed in a horizontal plane and longitudinally with respect to the vehicle and is journaled in bearing brackets 31 which are secured at their outer terminals to the automobile chassis. Upon the jack shaft is keyed for longitudinal sliding movement, a clutch pinion 32 which is adapted, when the starter is to be operated, to mesh with the gear teeth formed on the periphery of the fly wheel 14. Normally the clutch pinion 32 is held in inactive position by means of a helical expansive spring 33, the one end of which is let into the jack shaft. As a means for moving the clutch pinion 32 into operative engagement with the fly wheel, there is provided a foot pedal 34 which is pivoted in the foot board of the vehicle and is operatively connected to a lever 35 by means of a draw rod 36. The lever is pivoted, intermediate its length on a suitable supporting bracket which may be secured to the chassis of the automobile or to any other convenient portion thereof. A yoke 37 is formed on the inner end of the lever to embrace the jack shaft and to pivotally receive the sleeve of the pinion 32. It will be readily observed that the pedal may be depressed to cause the swinging of the lever and the consequent movement of the pinion 32 into engagement with the fly wheel against the tension of the spring.

The actual construction and arrangement of the several parts of the invention, being thus disclosed, it now remains to briefly describe the manner in which these various parts operate when the starter is manipulated to turn over the crank shaft of the engine. If it is desired to turn the crank 17 in a clockwise direction, the rotation of the shaft 10 will be communicated to the shaft 12 by means of the pinion 18, the clutch member 20 of which will be positively engaged by the clutch member 22. During this clockwise rotation of the shaft 10, the clutch member 21 will, of course, slip over the face of the clutch member 23, so that the shaft 11 will remain stationary. The rotation of the shaft 12 will be communicated by means of the pinion 29 to the pinion 30 of the jack shaft. Prior to the turning of the crank 24, the pedal has, of course, been operated to move the pinion 22 into engagement with the fly wheel. Thus the rotation of the jack shaft will be communicated to the fly wheel, causing this member to rotate in a clockwise direction in the usual manner.

If it is desired to rotate the crank 24 in a counter-clockwise direction, the rotation of the shaft 10 will be communicated to the shaft 11 by means of the pinion 19. During this counter-clockwise rotation of the shaft 10, the clutch member 22 will slip over the face of the member 20 so that the pinion 18 will be inactive. The rotation of the shaft 11 will be communicated from the members 27 and 28 to the shaft 11, which in turn will, through the medium of the pinions 29 and 30, rotate the jack shaft. The rotation of the jack shaft will be transmitted through the pinion 32 to the fly wheel, producing a clockwise rotation of this latter member, in the same manner as when the crank 24 is rotated in a clockwise direction.

From the foregoing description, it will now be seen that regardless of the direction in which the cranking handle 24 of my starter is rotated, the fly wheel and, consequently the crank shaft of the engine will always be rotated in a clockwise direction. It will, therefore, be apparent that the starter may be used by either a right or left hand operator or may be operated by reciprocating the crank 24 back and forth in a small arc.

The clutch indicated at 38 is, of course, interposed in the crank shaft of the engine so that in case of back-firing, the reverse rotation of the crank shaft will not be transmitted to the handle 24.

It is to be observed that the pinions 25 and 26 are relatively wide as compared to the pinions 18 and 19 so that these members may slide with respect to the pinions 25 and 26, without becoming disengaged therefrom during the rotation of the shaft 10. I desire to explain that the pinion 32 may be disposed to mesh with gear teeth formed on the forward end of the crank shaft, instead of with the fly wheel, if such a change be deemed advisable.

In reduction to practice, it has been found that the form of this invention illustrated in the drawings and referred to in the above description as the preferred embodiment is the most efficient and practical; yet realizing that the conditions concurrent with the adoption of this device will necessarily vary, it is desirable to emphasize the fact that various minor changes in the details of construction, proportion and arrangement of parts may be resorted to, when re-

What is claimed is:—

1. The combination with an automobile engine having a crank shaft, of a manually operable starting device including a cranking shaft rotatable a plurality of times in either direction, and means operatively connecting the cranking shaft to the crank shaft to automatically cause a rotation of the crank shaft in a constant direction regardless of the direction of rotation of the cranking shaft.

2. The combination with an automobile engine, of a manually operable starting device including a cranking shaft rotatable a plurality of times in either direction, and means for operatively connecting the cranking shaft to the crank shaft of the engine, said means causing a rotation of the crank shaft in a constant direction regardless of the direction of rotation of the cranking shaft.

3. The combination with an automobile engine, of a cranking device including a cranking shaft, a pair of parallel driven shafts, means operatively connecting the cranking shaft and driven shafts, said means being automatically operable for positively connecting the cranking shaft and one of the driven shafts when the cranking shaft is rotated in a clockwise direction and for positively connecting the cranking shaft to the other driven shaft upon the rotation of the cranking shaft in a counter-clockwise direction, and means for operatively connecting the driven shafts to the crank-shaft of the engine.

4. The combination with an automobile engine, of a cranking device including a cranking shaft, a pair of parallel driven shafts, means operatively connecting the cranking shaft and driven shafts, said means being automatically operable to positively connect the cranking shaft and one of the driven shafts when the cranking shaft is rotated in a clockwise direction, and to positively connect the cranking shaft to the other driven shaft upon the rotation of the cranking shaft in a counter-clockwise direction, means operatively connecting the driven shafts, and means for operatively connecting the driven shafts to the crank shaft.

5. In a construction of the character described, a main shaft, a driving shaft rotatable a plurality of revolutions in either direction, means for rotating the driving shaft, and transmission gearing operatively engaging the driving shaft with the main shaft at all times and causing the rotation of the main shaft in one constant direction upon a rotation of the driving shaft in either direction.

6. In a construction of the character described, a driving shaft, a pair of shafts parallel to the driving shaft, means operatively connecting the driving shaft with said parallel shafts, said means being automatically operable for operatively connecting the driving shaft and one of the parallel shafts when the driving shaft is rotated in a clockwise direction and for operatively connecting the driving shaft to the other shaft upon a rotation of the driving shaft in a counter-clockwise direction, a driven shaft, and means for operatively connecting both of said parallel shafts to said driven shaft.

7. In an automobile, an engine including a crank shaft having a gear wheel mounted thereon, a cranking shaft disposed parallel to the engine and having means at its rear end whereby it may be manually rotated, and means operatively connecting the cranking shaft to the crank shaft of the engine, including a slidable gear wheel adapted to engage with the gear wheel of the crank shaft when moved in one position, and means for shifting the slidable gear wheel into or out of such engagement.

8. In an automobile, an engine including a crank shaft, a gear wheel rotatably mounted upon the crank shaft, but shiftable longitudinally thereof, clutch members mounted respectively upon the crank shaft and the gear wheel, said clutch members having teeth inclined in one direction, a spring normally urging the clutch members into interlocking engagement, a cranking shaft extending parallel to the engine, means carried upon said cranking shaft rearward of the engine, whereby the cranking shaft may be rotated, and means for transmitting the movement of the cranking shaft to the crank shaft including a slidable gear wheel engaging in one position with the gear wheel of the crank shaft, and in another position disengaging therefrom, and means for shifting the gear wheel into either of its positions.

9. The combination with an automobile engine, of a cranking device including a cranking shaft, a pair of parallel driven shafts, means operatively connecting the cranking shaft and driven shafts, said means being automatically operable to positively connect the cranking shaft and one of the driven shafts, when the cranking shaft is rotated in a clockwise direction, and to positively connect the cranking shaft to the other driven shaft upon the rotation of the cranking shaft in a counter-clockwise direction, means operatively connecting the driven shafts, and means for operatively connecting the driven shafts to the crank shaft, said means including a gear wheel mounted upon the crank shaft of the engine, and a gear wheel operatively connected to one of said driven shafts and shiftable into and out of engagement with the gear wheel of the crank shaft, means for normally urging the gear wheel on the driven shaft out of engagement with the gear wheel on the crank shaft, and manually operable means for shifting the gear wheel on the driven shaft into engagement with the gear wheel on the crank shaft.

In testimony whereof I hereunto affix my signature in the presence of two witnesses.

ACHILLES B. TOGNINI.

Witnesses:
  Bocco Gaggioni,
  E. Genardini.